United States Patent
Borlick et al.

(10) Patent No.: US 10,552,500 B2
(45) Date of Patent: Feb. 4, 2020

(54) PRESENTING A DATA INSTANCE BASED ON PRESENTATION RULES

(71) Applicant: International Business Machines Corporation, Armonk, NY (US)

(72) Inventors: Matthew G. Borlick, Tucson, AZ (US); Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/448,442

(22) Filed: Mar. 2, 2017

(65) Prior Publication Data

US 2018/0253560 A1    Sep. 6, 2018

(51) Int. Cl.
*G06F 16/9535* (2019.01)
*G06F 21/60* (2013.01)

(52) U.S. Cl.
CPC ........ *G06F 16/9535* (2019.01); *G06F 21/604* (2013.01)

(58) Field of Classification Search
CPC .................. G06F 21/604; G06F 17/30867
See application file for complete search history.

(56) References Cited

U.S. PATENT DOCUMENTS

| 8,082,563 | B2 | 12/2011 | Gabriel et al. | |
|---|---|---|---|---|
| 8,621,554 | B1* | 12/2013 | Yu | H04W 4/21 726/1 |
| 9,215,236 | B2 | 12/2015 | Kennedy | |
| 9,350,914 | B1* | 5/2016 | Kaur | H04N 5/23229 |
| 9,396,354 | B1* | 7/2016 | Murphy | G06F 21/6245 |
| 9,430,673 | B1* | 8/2016 | Bowers | G06F 21/6245 |
| 2004/0201668 | A1* | 10/2004 | Matsubara | H04L 67/104 348/14.05 |
| 2006/0143464 | A1* | 6/2006 | Ananthanarayanan | G06F 21/6218 713/182 |
| 2008/0168527 | A1* | 7/2008 | Koved | G06F 21/33 726/1 |
| 2009/0262987 | A1* | 10/2009 | Ioffe | G06K 9/00281 382/118 |
| 2010/0146301 | A1* | 6/2010 | Shevchenko | H04L 63/0407 713/193 |
| 2010/0217794 | A1* | 8/2010 | Strandell | H04L 67/2804 709/203 |

(Continued)

FOREIGN PATENT DOCUMENTS

CN        101379464 B     5/2015

OTHER PUBLICATIONS

Pallas, Frank et al., "Offlinetags—A Novel Privacy Approach to Online Photo Sharing", CHI 2014, Apr. 26-May 1, 2014, Toronto, ON, Canada, pp. 2179-2184 (Year: 2014).*

*Primary Examiner* — Michael Pyzocha
(74) *Attorney, Agent, or Firm* — Kunzler Bean & Adamson

(57) ABSTRACT

For presenting a data instance based on data rules, a processor retrieves a data unique identifier from a data instance. The processor further identifies each person associated with the data instance. The processor presents the data instance based on presentation rules for each person. The presentation rules are a function of one or more of a personal jurisdiction of each person, a jurisdiction of the presentation of the data instance, and a current time. No presentation rules for each person are violated.

21 Claims, 9 Drawing Sheets

(56) References Cited

U.S. PATENT DOCUMENTS

| | | | |
|---|---|---|---|
| 2011/0047508 A1* | 2/2011 | Metzler | G06Q 30/02 |
| | | | 715/810 |
| 2011/0202968 A1* | 8/2011 | Nurmi | G06F 21/10 |
| | | | 726/1 |
| 2011/0225200 A1* | 9/2011 | Danis | G06Q 10/10 |
| | | | 707/783 |
| 2011/0314071 A1 | 12/2011 | Johnson et al. | |
| 2012/0005720 A1* | 1/2012 | McGloin | G06F 21/6263 |
| | | | 726/1 |
| 2013/0145027 A1* | 6/2013 | Parthasarathy | G06F 21/6218 |
| | | | 709/225 |
| 2014/0089272 A1* | 3/2014 | Biswas | G06F 16/958 |
| | | | 707/692 |
| 2014/0096261 A1* | 4/2014 | Boldyrev | G06F 21/6263 |
| | | | 726/26 |
| 2014/0112534 A1* | 4/2014 | Sako | G06F 21/6245 |
| | | | 382/103 |
| 2014/0344953 A1* | 11/2014 | Roundtree | G06F 21/10 |
| | | | 726/28 |
| 2015/0033362 A1* | 1/2015 | Mau | G06K 9/00288 |
| | | | 726/27 |
| 2016/0105382 A1* | 4/2016 | Bin Mahfooz | G06F 3/16 |
| | | | 709/204 |
| 2016/0132719 A1* | 5/2016 | Fithian | G06F 16/5866 |
| | | | 345/647 |
| 2016/0294781 A1* | 10/2016 | Ninan | H04L 63/0407 |
| 2017/0004602 A1* | 1/2017 | Le Jouan | G06T 5/002 |
| 2017/0249394 A1* | 8/2017 | Loeb | G06F 17/30873 |
| 2018/0061010 A1* | 3/2018 | Akselrod | G06T 5/002 |
| 2018/0295208 A1* | 10/2018 | Li | H04L 51/32 |

* cited by examiner

280

| Data Unique Identifier 210 ||
|---|---|
| Presentation Rules 240 | Presentation Version 255 |
| Presentation Rules 240 | Presentation Version 255 |
| Presentation Rules 240 | Presentation Version 255 |

PRESENTING A DATA INSTANCE BASED ON PRESENTATION RULES

FIELD

The subject matter disclosed herein relates to presenting a data instance and more particularly relates to presenting a data instance based on presentation rules.

BACKGROUND

Data instances such as images, video, audio, personal information, documents, messages, and executable code may reference multiple people, and be subject to regulations in multiple jurisdictions.

BRIEF SUMMARY

A method for presenting a data instance based on data rules is disclosed. A processor retrieves a data unique identifier from a data instance. The processor further identifies each person associated with the data instance. The processor presents the data instance based on presentation rules for each person. The presentation rules are a function of one or more of a personal jurisdiction of each person, a jurisdiction of the presentation of the data instance, and a current time. No presentation rules for each person are violated. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
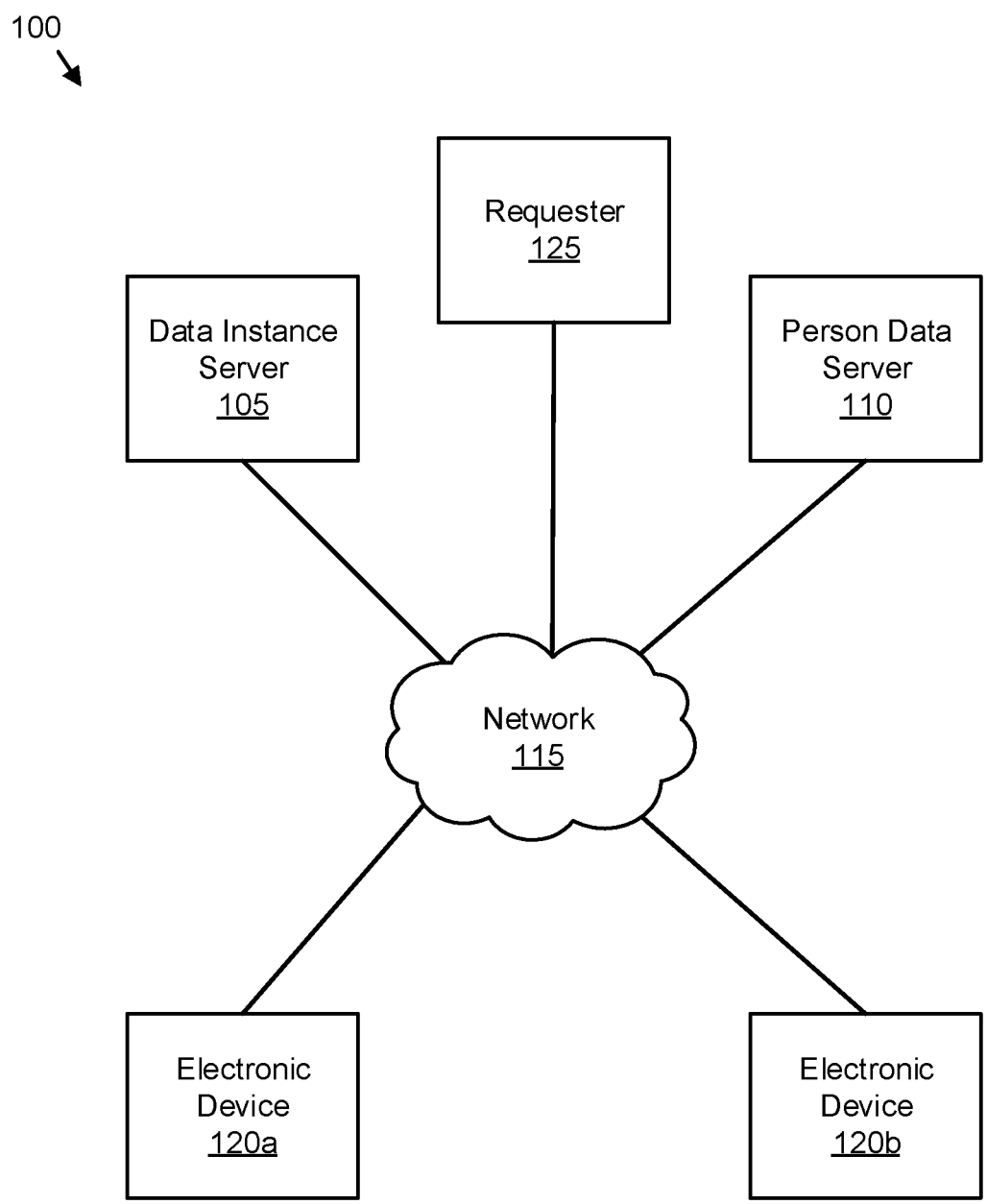
FIG. 1 is a schematic block diagram illustrating one embodiment of a presentation system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a presentation system 100. In the depicted embodiment, the system 100 includes a data instance server 105, a requester 125, a person data server 110, a network 115, and one or more electronic devices 120. The system 100 may present a data instance based on presentation rules for one or more persons. The data instance may be an image, a video, an audio recording, a document, a message, executable code, or the like. The data instance may be images, video, audio, documents, personal information, messages, executable code, and the like for one or more persons.

The network 115 may comprise one or more of the Internet, a mobile telephone network, a wide-area network, a Wi-Fi network, a local area network, or combinations thereof. The requestor 125 may be one or more of social media, data mining, a search engine, and/or an Internet application.

In one embodiment, a first electronic device 120a may upload the data instance through the network 115 to the data instance server 105. For example, the data instance server 105 may be a social media provider, an online database, or the like. Subsequently, the second electronic device 120b may request the data instance from the data instance server 105. Alternatively, a requester 125 may request the data instance from the data instance server 105 for presentation to the second electronic device 120b. For example, the requester 125 may be a search engine with metadata referencing the data instance.

One or more persons included in the data instance may not wish for the data instance to be presented. In addition, in some jurisdictions, the one or more persons may have a legal right to prevent the presentation of data instances that include their images, video, audio, personal information.

The embodiments described herein present the data instance based on presentation rules for each person associated with the data instance. As a result, the presentation of the data instance may be blocked if the one or more of the persons do not wish the data instance to be presented and/or if the one or more persons have a legal right to prevent the presentation of the data instance. Persons may allow or prevent the presentation of data instances from one or more data instance servers 105 based on presentation rules for the persons.

In one embodiment, the data instance server 105 may interrogate person data on the person data server 110 to determine presentation rules for the data instance. Alternatively, the person data may be stored on the data instance server 105. The data instance server 105 may further use presentation rules to determine whether to present the data instance as will be described hereafter.

Figure 2A:
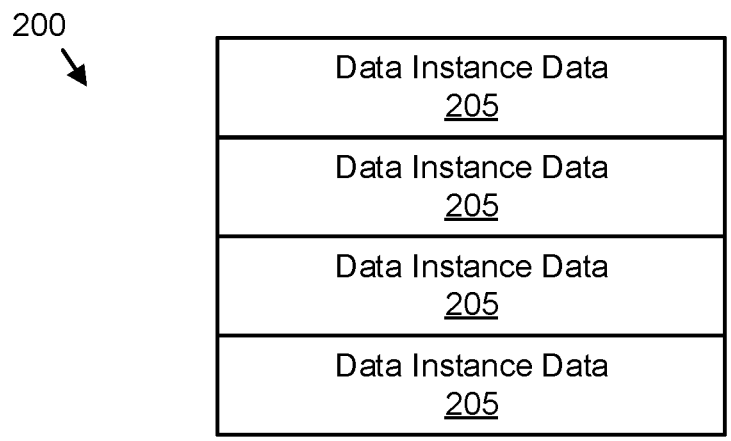
FIG. 2A is a schematic block diagram illustrating one embodiment of a data instance database.

FIG. 2A is a schematic block diagram illustrating one embodiment of the data instance database 200. The data instance database 200 may store a plurality of data instance data 205. The data instance database 200 may reside on the data instance server 105. Alternatively, the data instance database 200 may be distributed across multiple servers. In one embodiment, the data instance data 205 may be created each time a data instance is uploaded to the data instance server 105.

Figure 2B:
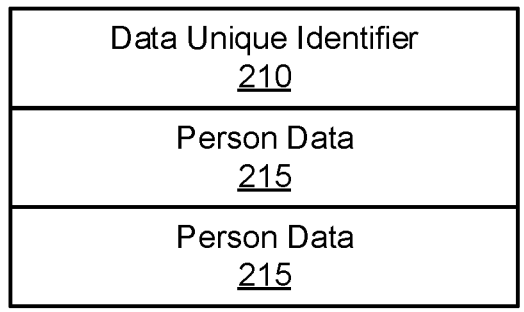
FIG. 2B is a schematic block diagram illustrating one embodiment of data instance data.
Figure 2B:
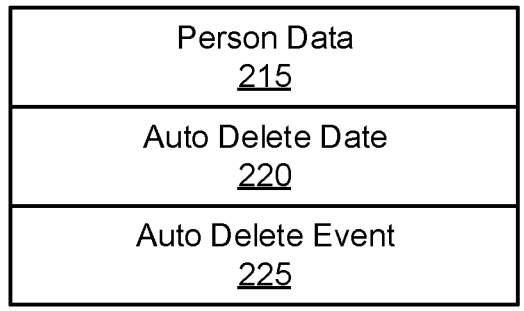

FIG. 2B is a schematic block diagram illustrating one embodiment of the data instance data 205. The data instance data 205 may be organized as a data structure in a memory. In the depicted embodiment, the data instance data 205 includes a data unique identifier 210, person data 215, and auto delete date 220, and an auto delete event 225.

The data unique identifier 210 may uniquely identify the data instance data 205. In one embodiment, the data unique identifier 210 is appended to the original data instance as metadata.

In one embodiment, an instance of person data 215 is included for each person that is associated with and/or referenced in the data instance. The person data 215 is described in more detail FIG. 3B. In one embodiment, the person data 215 in the data instance data 205 comprises only a person identifier that references more complete person data 215 in a person database that will be described in FIG. 3A.

The auto delete date 220 may specify a date and/or time after which the data instance may be deleted from the data instance server 105 and/or the data instance database 200. For example, if the auto delete date 220 is Mar. 21, 2018, the data instance will be deleted on or after Mar. 21, 2018 occurs.

The auto delete event 225 may specify an event wherein after the event occurs, the data instance will be deleted from the data instance server 105. For example, the specified event may be an address change, a job change, a relationship change, the changing of the retention option, the filing of a legal request, or the like. In one embodiment, the auto delete event 225 comprises a change in the privacy options. The data instance server 105 may delete the data instance in response to the auto delete event 225 occurring.

Figure 2C:
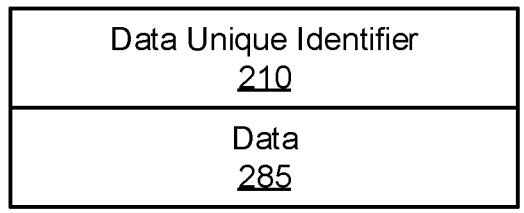
FIG. 2C is a schematic block diagram illustrating one embodiment of a data instance.

FIG. 2C is a schematic block diagram illustrating one embodiment of a data instance 280. The data instance 280 maybe organized as a data structure in a memory. In the depicted embodiment, the data instance 280 includes the data unique identifier 210 and data 285. The data unique identifier 210 may be included with metadata for the data instance 280. The data 285 may include one or more of images, video, audio, personal information, documents, messages, executable code, and the like.

Figure 2D:
FIG. 2D is a schematic block diagram illustrating one alternate embodiment of a data instance.

FIG. 2D is a schematic block diagram illustrating one embodiment alternate embodiment of a data instance 280. The data instance 280 may be organized as a data structure in a memory. In the depicted embodiment, the data instance 280 includes a plurality of presentation versions 255 that are each associated with specific presentation rules 240. For example, the data instance 280 may comprise two or more images. One of the two or more images may be presented based on the presentation rules 240 for each person.

The data instance 280 includes the data unique identifier 210. In addition, the data instance includes the plurality of presentation versions 255. For example, a first presentation version 255 may include a full version of a document while a second presentation version 255 includes a redacted version of the document. In an alternative example, the first presentation version 255 may include an image of the person from a vacation while the second presentation version 255 comprises the standard status image of the person. The presentation version 255 associated with the presentation rules 240 that apply to the specified jurisdiction 235 may be selected for presentation. In a certain embodiment, the presentation version 255 may be NULL data that does not include any data.

In one embodiment, each presentation rule 240 is applicable for a specified date and/or time interval. For example, a presentation rule 240 may only be satisfied during a recurring time intervals such as a weekend or business hours. In addition, the presentation rule 240 may only be satisfied until a specified date. In one embodiment, the presentation rule 240 is only satisfied after the specified date.

Figure 3A:
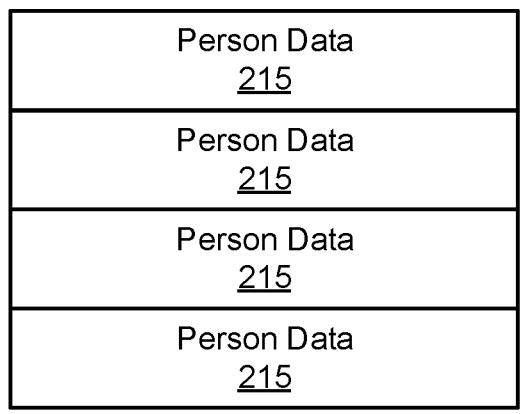
FIG. 3A is a schematic block diagram illustrating one embodiment of a person database.

FIG. 3A is a schematic block diagram illustrating one embodiment of a person database 201. The person database 201 may be organized as a data structure in a memory. The person database 201 may reside on the person data server 110. Alternatively, the person database 201 may reside on the data instance server 105. The person database 201 may store a plurality of person data 215. In one embodiment, person data 215 is centralized in the person database 201.

Figure 3B:
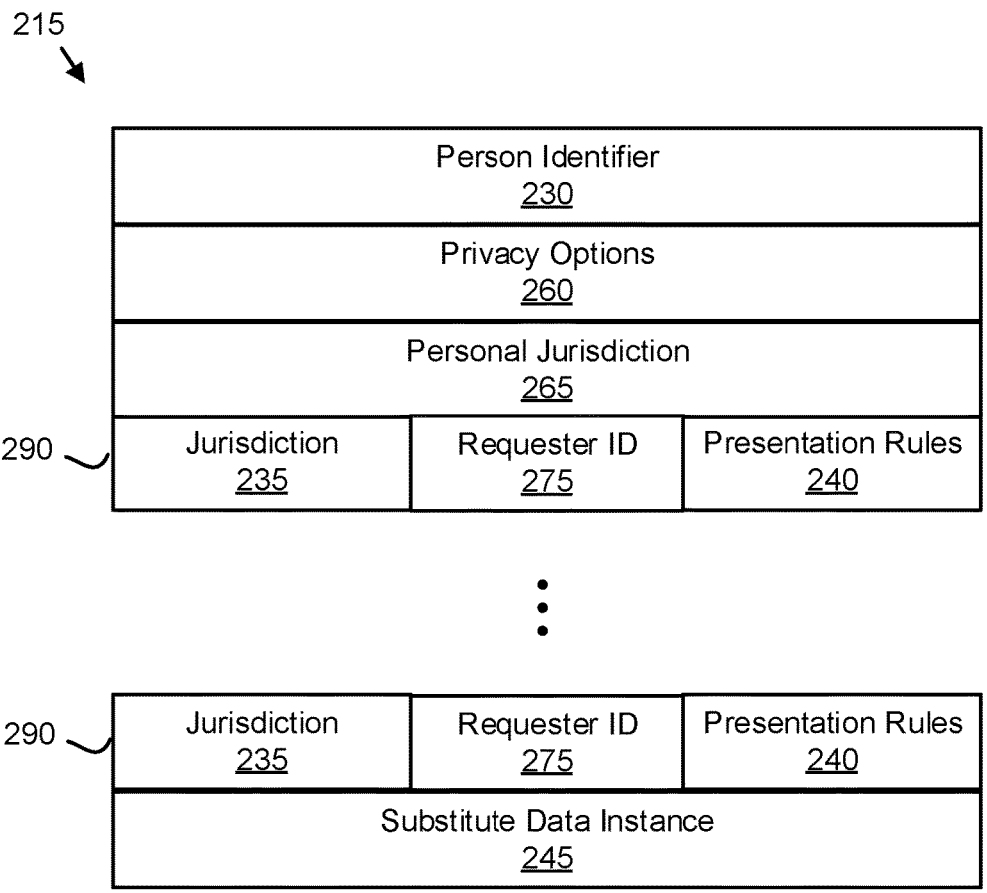
FIG. 3B is a schematic block diagram illustrating one embodiment of person data.

FIG. 3B is a schematic block diagram illustrating one embodiment of the person data 215. The person data 215 may specify when a data instance 280 may be presented for a specific person. The person data 215 maybe organized as a data structure in a memory. In the depicted embodiment, the person data 215 includes the person identifier 230, privacy options 260, a personal jurisdiction 265, one or more jurisdiction entries 290, and a substitute data instance 245. Each jurisdiction entry 290 may include a jurisdiction 235, a requester identifier 275, and presentation rules 240. The person data 215 may be stored in a person database 201 on the person data server 110. Alternatively, the person data 215 may be stored in the data instance data 205.

The person identifier 230 may uniquely identify a person. The person identifier 230 may include one or more of a national identification number, a birthdate, an address, an email address, phone number, and the like.

The privacy options 260 may specify when to present a data instance 280 for the person. The privacy options 260 may include a "never present" option, an "always present" option, and a "conditional presentation" option. For example, if the "never present" option is selected, a data instance 280 associated with the person will not be presented. Similarly, if the "always present" option is selected, the data instance 280 associated with the person will be presented.

The conditional presentation option may specify one or more conditions for presenting or not presenting the data instance 280. The conditional presentation option may allow presentation of a data instance 280 that includes the person to one or more specified people. In addition, the conditional presentation option may allow presentation of a data instance 280 that includes the person during specified time intervals and/or specified recurring time intervals.

In a certain embodiment, the privacy options 260 include an "if not prohibited" option, wherein the data instance 280 may be presented if not prohibited by one or more of the jurisdiction where the person resides and the jurisdiction where the data instance 280 will be presented.

The personal jurisdiction 265 may specify the jurisdiction in which the person resides. For example, the personal jurisdiction 265 may be France.

The jurisdiction entries 290 may specify presentation rules 240 for the person in one or more jurisdictions 235. For example, the jurisdiction entries 290 may specify a presentation rule 240 for each of the plurality of jurisdictions 235. The requester identifier 275 may be NULL for some jurisdiction entries 290, and be considered always satisfied.

In addition, the jurisdiction entries 290 may specify presentation rules 240 for one or more combinations of the jurisdiction 235 and requester identifiers 275. A requester identifier 275 may identify a specific requester 125 and/or a type of requester. For example, the requester identifier 275 may specify a type comprising one or more of social media, data mining, search engines, news compilations, or the like. Alternatively, the requester identifier 275 may identify a specific requester 125 such as a GOOGLE® search engine.

The presentation rules 240 may specify if a data instance 280 that includes the person may be presented for the combination of jurisdiction 235 and requester identifier 275. The presentation rules 240 may be generated based on laws for each jurisdiction 235. In addition, the presentation rules 240 may be specified by the person. For example, the person may login to the person data server 110 and specify the presentation rules 240 and/or the privacy options 260. In one embodiment, the presentation rules 240 and/or privacy options 260 are initially set to default values.

In one embodiment, the presentation rules 240 may specify that the substitute data instance 245 be presented in place of the data instance 280. The substitute data instance 245 may include a notice, an image, a video clip, an audio clip, and/or document that the person has specified should be presented instead of a data instance 280. For example, the substitute data instance 245 may include a notice that personal information for the person cannot be presented. The substitute data instance 245 may further explain why the data instance 280 cannot be presented.

Figure 4:
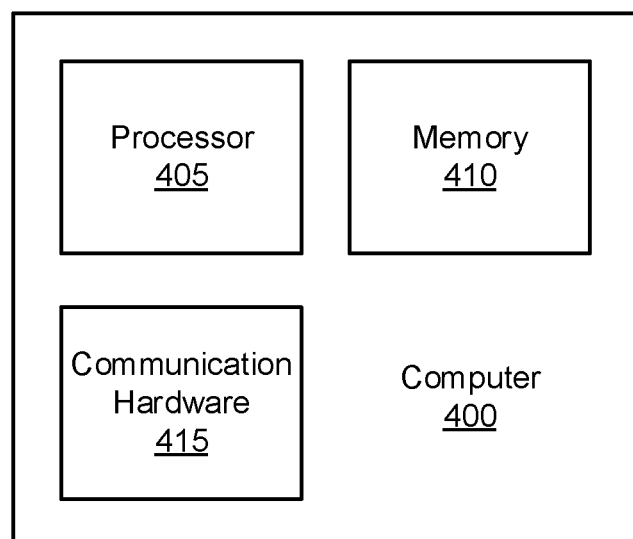
FIG. 4 is a schematic block diagram illustrating one embodiment of the computer.

FIG. 4 is a schematic block diagram illustrating one embodiment of the computer 400. The computer 400 may be embodied in one or more of the data instance server 105, the requester 125, the person data server 110, and/or the electronic devices 120. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store program instructions. The processor 405 may execute the program instructions. The communication hardware 415 may communicate with other devices and/or the network 115.

Figure 5A:
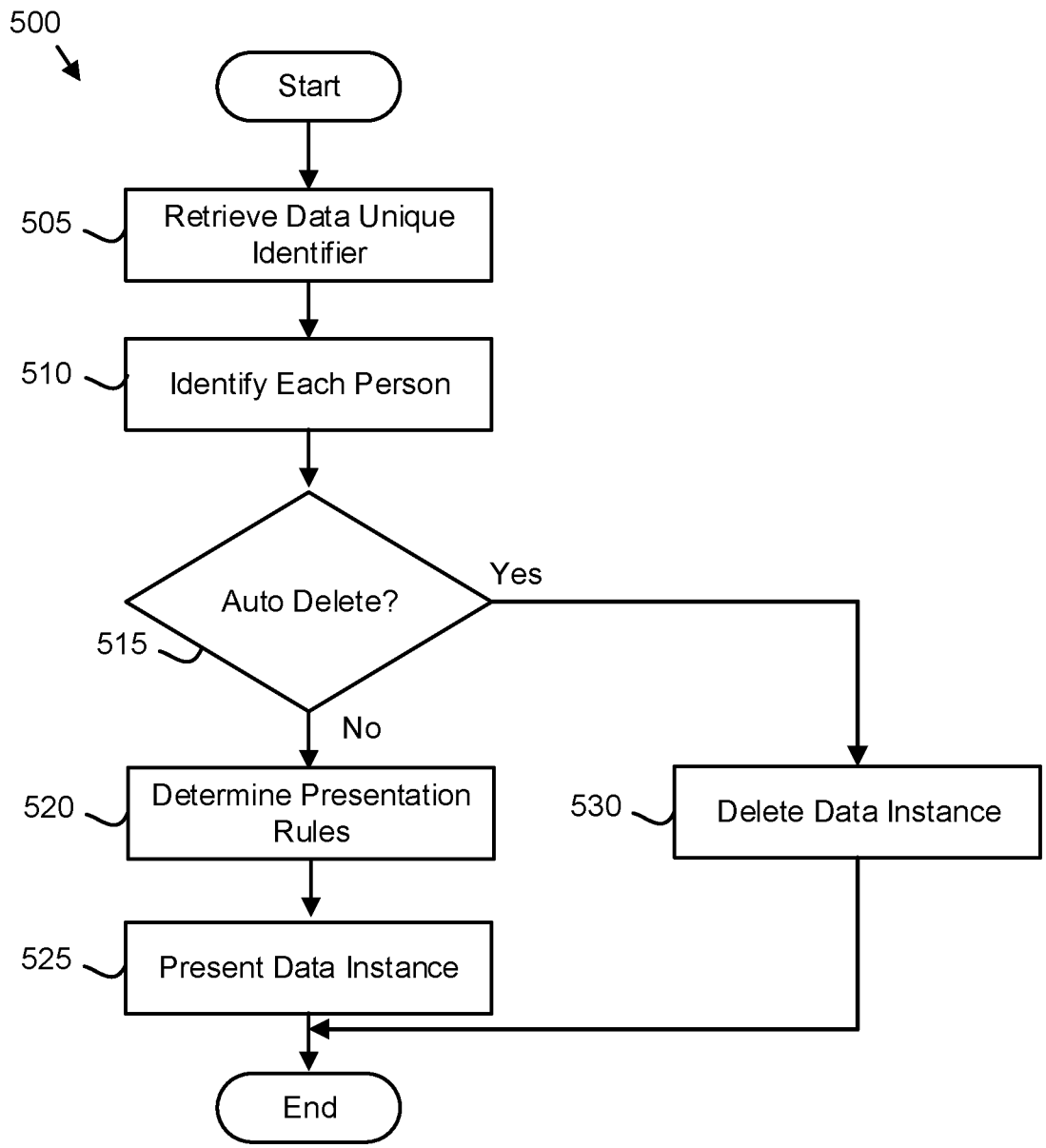
FIG. 5A is a schematic flow chart diagram illustrating one embodiment of a data instance presentation method.

FIG. 5A is a schematic flow chart diagram illustrating one embodiment of a data instance presentation method 500. The method 500 may present the data instance 280 based on the presentation rules 240 for each person associated with the data instance 280. The method 500 may be performed by the computer 400 and/or the processor 405 of the computer 400. In one embodiment, the method 500 may be performed by a computer program product comprising a computer readable storage medium having program instructions embedded therewith.

The method 500 starts, and in one embodiment, the processor 405 retrieves 505 the data unique identifier 210 from the data instance 280. The data instance 280 may be requested from the data instance server 105 by the requester 125 and/or by the electronic device 120. For example, the electronic device 120 may request the presentation of the data instance 280 as part of social media information provided by a social media data instance server 105. The processor 405 may parse the data unique identifier 210 from the requested data instance 280.

The processor 405 may identify 510 each person associated with the data instance 280. In one embodiment, the processor 405 may use the data unique identifiers 210 to retrieve the data instance data 205 from the data instance database 200. The processor 405 may further access the person data 215 from the data instance data 205 and/or person database 201 to identify 510 each person associated with the data instance 280.

In an alternative embodiment, the processor 405 may employ a recognition technology such as facial recognition technology, name recognition technology, and/or voice recognition technology to identify 510 each person associated with the data instance 280. The processor 405 may further create the person data 215 for each person identified 510 as being associated with the data instance 280.

The processor 405 may determine 515 whether an auto delete condition is satisfied for the data instance 280. For example, the processor may determine 515 whether the auto delete date 220 has occurred and/or the auto delete event 225 has occurred. If either of the auto delete date 220 has occurred or the auto delete event 225 has occurred, the auto delete condition may be satisfied.

The processor 405 may delete 530 the data instance 280 in response to one or more of the auto delete date 220 occurring and the auto delete event 225 occurring and the method 500 ends without presenting the data instance 280. If the auto delete date 220 has not occurred and/or the auto delete event 225 has not occurred, the processor 405 may determine 520 the presentation rules 240 for the data instance. The presentation rules 240 may be a function of one or more of a personal jurisdiction 265 of each person, a jurisdiction 235 of the presentation of the data instance. In addition, the presentation rules 240 may be a function of a current time and/or date. The determination 520 of the presentation rules 240 are described in more detail in FIG. 5B.

The processor 405 may further present 525 the data instance 280 based on the presentation rules 240 for each person associated with the data instance 280 and the method 500 ends. In one embodiment, no presentation rules 240 for each person associated with the data instance 280 are violated. For example, the data instance 280 may be presented if the presentation rules 240 for each person associated with the data instance 280 allow the data instance 280 to be presented.

If presentation rules 240 for at least one person are not satisfied, the data instance 280 may not be presented 520. In addition, if the presentation rules 240 for a least one person are not satisfied, a substitute data instance 245 may be presented 520.

In one embodiment, the presentation version 255 associated with presentation rules 240 that satisfy the presentation rules 240 for each person associated with the data instance 280 may be presented 520. For example, if the presentation rules 240 for each person associated with the data instance 280 are satisfied by third presentation rules 240, the presentation version 255 associated with the third presentation rules 240 may be presented 520. The data instance 280 may be presented by communicating the data instance 280 through the network 115 to the electronic device 120.

Figure 5B:
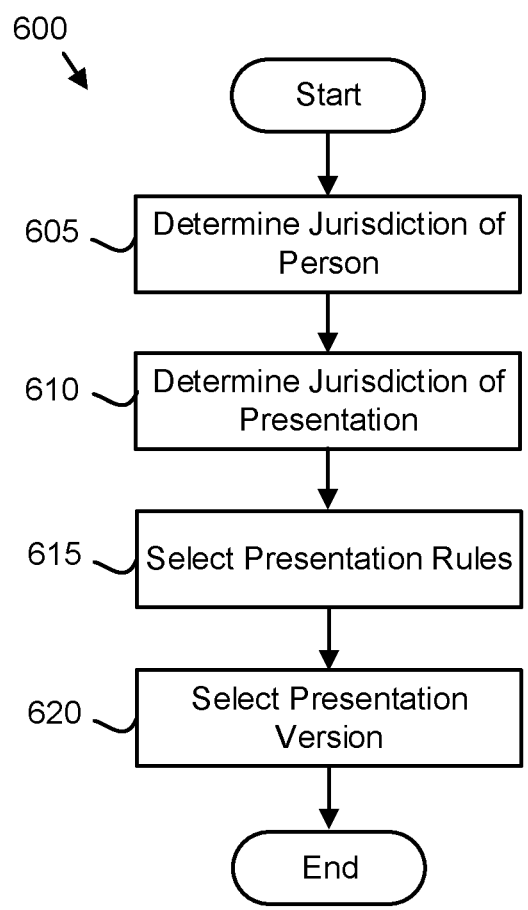
FIG. 5B is a schematic flow chart diagram illustrating one embodiment of a presentation rule determination method.

FIG. 5B is a schematic flow chart diagram illustrating one embodiment of a presentation rule determination method 600. The method 600 may be performed by the computer 400 and/or the processor 405 of the computer 400. In one embodiment, the method 600 may be performed by a computer program product comprising a computer readable storage medium having program instructions embedded therewith.

The method 600 starts, and in one embodiment, the processor 405 determines 605 the jurisdiction of each person associated with the data instance 280. The processor 405 may determine 605 the jurisdictions from the personal jurisdiction 265 associated with the person data 215 for each person.

The processor 405 may further determine 610 the jurisdiction in which the data instance 280 will be presented. In one embodiment, the processor 405 determines 610 the jurisdiction based on the Internet Protocol (IP) address of the requesting electronic device 120 and/or requester 125. The processor 405 may further select 615 the presentation rules 240.

In one embodiment, presentation rules 240 are selected 615 from jurisdiction entries 290 with a jurisdiction 235 that corresponds to the personal jurisdiction 265. In one embodiment, the most permissive presentation rules 240 are selected 615. Alternatively, the least permissive presentation rules 240 may be selected 615.

In addition, the presentation rules 240 may be selected 615 from jurisdiction entries 290 with the jurisdiction 235 that corresponds to the jurisdiction in which the data instance 280 will be presented.

The presentation rules may be further selected 615 based on the requester 125. In a certain embodiment, the presentation rules 240 are selected 615 from jurisdiction entries 290 with the jurisdiction 235 the corresponds to the jurisdiction in which the data instance 280 will be presented and with the requester identifier 275 that corresponds to the type of the requester 125 and/or the specific requester 125. In addition, the presentation rules 240 may be selected 615 from jurisdiction entries 290 with the jurisdiction 235 that corresponds to the personal jurisdiction 265 and with the requester identifier 275 that corresponds to the type of the requester 125 and/or the specific requester 125.

In one embodiment, the processor 405 selects 620 a presentation version 255 that corresponds to the selected presentation rules 240 and the method 600 ends. The presentation version 255 may be selected 620 that corresponds to the least permissive presentation rules 240. Alternatively, the presentation version 255 may be selected 620 that corresponds to the most permissive presentation rules 240.

The embodiments employ a data unique identifier 210 retrieved from a data instance 280 to identify each person associated with the data instance 280. The embodiments further present or block presentation of the data instance 280 based on presentation rules 240 for each person. As a result, privacy options 260 and/or legal requirements for various jurisdictions 235 are honored.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
retrieving, by use of a processor, a data unique identifier from a data instance;
identifying each person of a plurality of persons associated with the data instance, wherein the data instance comprises images of the plurality of persons; and
presenting the data instance with a substitute data instance image for a first person of the plurality of persons based on least permissive presentation rules for the first person of a plurality of presentation rules, wherein the substitute data instance image is an audio clip that explains that personal information for the first person cannot be presented, the plurality of presentation rules are a function of one or more of a personal jurisdiction of each person, a jurisdiction of the presentation of the data instance, and a current time, and wherein no presentation rules for each person are violated.

2. The method of claim 1, the method further comprising:
determining the personal jurisdiction of each person;
determining the jurisdiction of the presentation of the data instance; and
selecting the least permissive presentation rules of the plurality of presentation rules that comply with privacy options for each person mandated by the jurisdiction of each person and the jurisdiction of the presentation of the data instance.

3. The method of claim 2, wherein the least permissive presentation rules are further selected based on a requestor.

4. The method of claim 3, wherein the requestor is one or more of social media, data mining, a search engine, and an Internet application.

5. The method of claim 1, wherein the data instance comprises two or more images, and one of the two or more images is presented based on the least permissive presentation rules for each person.

6. The method of claim 1, the method further comprising deleting the data instance in response to an auto delete date occurring.

7. The method of claim 1, the method further comprising deleting the data instance in response to an auto delete event occurring.

8. The method of claim 7, wherein the auto delete event comprises a change in a privacy option.

9. An apparatus comprising:
a processor;
a memory storing program instructions executable by the processor to perform:
retrieving a data unique identifier from a data instance;
identifying each person of a plurality of persons associated with the data instance; and
presenting the data instance with a substitute data instance image for a first person of the plurality of persons based on least permissive presentation rules for the first person of a plurality of presentation rules, wherein the substitute data instance image is an audio clip that explains that personal information for the first person cannot be presented, the plurality of presentation rules are a function of one or more of a personal jurisdiction of each person, a jurisdiction of the presentation of the data instance, and a current time, and wherein no presentation rules for each person are violated.

10. The apparatus of claim 9, wherein the processor further performs:
    determining the personal jurisdiction of each person;
    determining the jurisdiction of the presentation of the data instance; and
    selecting the least permissive presentation rules of the plurality of presentation rules that comply with privacy options for each person mandated by the jurisdiction of each person and the jurisdiction of the presentation of the data instance.

11. The apparatus of claim 10, wherein the least permissive presentation rules are further selected based on a requestor.

12. The apparatus of claim 11, wherein the requestor is one or more of social media, data mining, a search engine, and an Internet application.

13. The apparatus of claim 9, the processor further deleting the data instance in response to an auto delete event occurring, wherein the auto delete event comprises a change in a privacy option.

14. A computer program product for presenting a data instance, the computer program product comprising a non-transitory computer readable storage medium having program instructions embodied therewith, the program instructions readable/executable by a processor to cause the processor to:
    retrieving a data unique identifier from a data instance;
    identifying each person of a plurality of persons associated with the data instance; and
    presenting the data instance with a substitute data instance image for a first person of the plurality of persons based on least permissive presentation rules for the first person of a plurality of presentation rules, wherein the substitute data instance image is an audio clip that explains that personal information for the first person cannot be presented, the plurality of presentation rules are a function of one or more of a personal jurisdiction of each person, a jurisdiction of the presentation of the data instance, and a current time, and wherein no presentation rules for each person are violated.

15. The computer program product of claim 14, the processor further deleting the data instance in response to an auto delete event occurring, wherein the auto delete event comprises a change in a privacy option.

16. The computer program product of claim 14, wherein the processor further performs:
    determining the personal jurisdiction of each person;
    determining the jurisdiction of the presentation of the data instance; and
    selecting the least permissive presentation rules of the plurality of presentation rules that comply with privacy options for each person mandated by the jurisdiction of each person and the jurisdiction of the presentation of the data instance.

17. The computer program product of claim 16, the processor further selecting a presentation version of the data instance based on the least permissive presentation rules.

18. The computer program product of claim 16, wherein the least permissive presentation rules are further selected based on a requestor.

19. The computer program product of claim 18, wherein the requestor is one or more of social media, data mining, a search engine, and an Internet application.

20. The apparatus of claim 9, wherein the data instance comprises two or more images, and one of the two or more images is presented based on the least permissive presentation rules for each person.

21. The computer program product of claim 14, wherein the data instance comprises two or more images, and one of the two or more images is presented based on the least permissive presentation rules for each person.

* * * * *